United States Patent [19]

Schultz

[11] 4,429,537

[45] Feb. 7, 1984

[54] HEAT PIPES TO REDUCE ENGINE EXHAUST EMISSIONS

[75] Inventor: Donald F. Schultz, Middleburg Heights, Ohio

[73] Assignee: The United States of America as represented by the Administrator of the National Aeronautics and Space Administration, Washington, D.C.

[21] Appl. No.: 229,693

[22] Filed: Jan. 30, 1981

[51] Int. Cl.³ .......................... F23R 3/32; F02C 7/10
[52] U.S. Cl. ......................................... 60/730; 60/736
[58] Field of Search ................... 60/736, 730, 39.51 R; 431/11, 161, 207

[56] References Cited

U.S. PATENT DOCUMENTS

| | | | |
|---|---|---|---|
| 2,662,373 | 12/1953 | Sherry et al. | 60/736 |
| 2,781,637 | 2/1957 | Dougherty | 60/736 |
| 3,101,593 | 8/1963 | Britton et al. | 60/736 |
| 3,287,906 | 11/1966 | McCormick | 60/39.51 R |
| 4,052,144 | 10/1977 | Marek | 60/39.51 R |

FOREIGN PATENT DOCUMENTS 2443064 7/1975 Fed. Rep. of Germany ........ 60/736

Primary Examiner—Carlton R. Croyle
Assistant Examiner—Jeffrey A. Simenauer
Attorney, Agent, or Firm—Norman T. Musial; John R. Manning; James A. Mackin

[57] ABSTRACT

A fuel combustor consists of an elongated casing 16 with an air inlet conduit portion 27 at one end, and having an opposite exit end 18. The casing is formed with an intermediate combustion space 19. An elongated heat pipe 29 is mounted longitudinally in the casing and is offset from and extends alongside the combustion space 19. The heat pipe 29 is in heat-transmitting relationship with the air intake conduit 27 for heating incoming air. Guide conduit structure 25 is provided for conveying the heated air from the intake conduit into the combustion space. A fuel discharge nozzle 26 is provided to inject fuel into the combustion space 19. A fuel conduit 32 from a fuel supply source 37 has a portion 33 engaged in heat transfer relationship of the heat pipe for preheating the fuel. The downstream end of the heat pipe 29 is in heat transfer relationship with the casing and is located adjacent to the downstream end of the combustion space. The offset position of the heat pipe relative to the combustion space minimizes the quenching effect of the heat pipe on the gaseous products of combustion, as well as reducing coking of the fuel on the heat pipe, thereby improving the efficiency of the combustor. The combustor may take various forms, such as a single-can combustor with the combustion chamber consisting of an intermediate enlarged lateral portion of the casing, with the heat pipe mounted axially in the main conduit portion of the casing, or a combustor of the annular-casing type using a plurality of longitudinal side-by-side heat pipes, with longitudinally spaced and laterally offset ducts leading from the air flow conduit portion to the various zones of the combustion chamber.

9 Claims, 6 Drawing Figures

HEAT PIPES TO REDUCE ENGINE EXHAUST EMISSIONS

The invention described herein was made by an employee of the United States government and may be manufactured and used by or for the government for government purposes without the payment of any royalties thereon or therefor.

FIELD OF THE INVENTION

This invention relates to fuel combustors for engines, and more particularly to fuel combustors employing heat-transfer devices for improving combustion efficiency and for reducing engine exhaust emissions of carbon monoxide, unburned hydrocarbons and oxides of nitrogen.

BACKGROUND OF THE INVENTION

In the prior art, pressure atomizing fuel nozzles of various types have been employed to inject fuel into the combustion air. Neither the air nor the fuel has been heated beyond what occurs by air compression. As a result, fuel combustor engines of the prior art have idle combustion efficiencies generally below 100%, some being as low as 60%. Low combustion efficiencies result in high exhaust emissions of carbon monoxide and unburned hydrocarbons.

Some attempts have been made to improve engine efficiency by using heat pipes to heat the incoming fuel prior to the injection thereof into the combustor, for example, as in U.S. Pat. No. 3,842,596 to Gray, employing heat exchangers in hollow turbine blades, wherein the collected heat is transferred to the incoming fuel to preheat it; or in U.S. Pat. No. 3,710,572 to Herud, which employs graphite filaments which act to conduct heat away from the combustion chamber, and wherein said heat is employed to preheat the incoming fuel and air.

The U.S. Pat. to Marek No. 4,052,144 discloses a fuel combustor having a chamber with air and fuel inlets and a combination of gas outlets, and of which the present invention is an improvement.

Various prior U.S. patents, in addition to those noted above, dislose engines having heat exchangers for preheating fuel and air, employing suitable heat exchange media, such as sodium. Thus, attention is invited to the following U.S. Pat. Nos.: Adams et al 3,024,606; Beam 3,355,883; Pravda 3,621,908; Wolf et al 3,733,826; and Koch 3,895,488.

The heat transfer arrangements of the prior art have serious disadvantages. One such major disadvantage is that the heat transfer element is responsible for causing excessive quenching of the combustion. Another serious disadvantage is that in some of the prior art systems where the fuel and air are not kept separate, auto-ignition occurs during preheating. Also, undesirable coking of the fuel on the heat pipe may occur, which causes interference with the transmission of heat.

Another disadvantage of prior art fuel-air preheating arrangements is that conventional cooling methods are employed, such as lines located downstream of the primary combustion zone. This makes it possible for quenching of combustion reactions to occur in these downstream regions, thereby causing incomplete combustion of the fuel.

SUMMARY OF THE INVENTION

In accordance with the present invention, a heat pipe is disposed in the combustor of an engine to transfer heat from the combustion zone to incoming fuel air before the fuel and air are admitted into the combustor. The heat pipe is positioned (offset) well away from the axis of the combustor to inhibit quenching. The assembly may comprise heat exchangers in three locations: one exchanger (the heat pipe) is effectively positioned close to the hot end of the combustion chamber to absorb heat and carry it away; the other two exchangers are used to preheat the incoming air and fuel separately. The heat pipe is partially filled with sodium or other suitable liquid(s).

The combustor liner using heat pipes according to the present invention has the advantage of providing an alternate means of cooling rich burn combustion zones other than with film cooling air which destroys the effectiveness of the rich-burn principle. By using heat pipes to cool the liner, reasonable liner temperatures consistent with good durability can be obtained without introducing film cooling air. Thus, heat pipes can be used to make desirable rich-burn primary combustion zones practical for fuel bound nitrogen (FNB) control.

Two significant improvements over the system of the Marek U.S. Pat. No. 4,052,144 are the offset location of the heat pipe in relation to the primary combustion zone, rather than being submerged in the primary combustion zone; and the use of a separate fuel heater which prevents autoignition of the air fuel mixture by keeping the fuel and air separate.

Accordingly, an object of the present invention is to overcome disadvantages and deficiencies of the prior art, such as indicated above; another object is to provide for improved engine combustion in jet engines.

A further object of the invention is to provide an improved engine combustor fuel and air preheating system which minimizes quenching of combustion in the engine combustion chamber and which reduces exhaust emissions of carbon monoxide and unburned hydrocarbons, thereby greatly increasing the efficiency of the engine.

A still further object of the invention is to provide an improved fuel and air preheating system which reduces engine exhaust emissions at engine idle by increasing combustion efficiency, and which is applicable to a wide range of land, sea and air engine applications.

A still further object of the invention is to provide an improved jet engine which employs a heat pipe to transfer heat from the engine combustion zone to incoming fuel and air, the heat pipe being so positioned as to minimize quenching of the combustion and to thereby facilitate complete combustion of the fuel, and wherein the heat is efficiently transferred separately to the incoming fuel and air before the fuel and air are admitted into the combustion chamber.

A still further object of the invention is to provide an improved jet engine combustion assembly which employs a heat pipe offset from the axis of the combustion chamber by a distance sufficient to minimize quenching of the combustion, the heat pipe being employed to transfer heat to the incoming fuel and air, the fuel being heated in a manner which eliminates the problem of auto-ignition upstream of the flame zone, and the arrangement being such as to prevent coking of the fuel on the heat pipe.

A still further object of the invention is to provide an improved jet engine combustion assembly with a heat pipe offset in relation to the primary combustion zone, the offset location preventing the heat pipe from quenching the combustion reaction, especially at ground start, altitude relight, or even at engine idle conditions, wherein auto-ignition of fuel-air mixtures is prevented by keeping the fuel and air separate during preheating, and which also prevents the fuel from coking on the heat pipe, enabling the heat pipe to operate at high temperatures, significantly reducing the surface area required to heat the inlet air and fuel while reducing any remaining tendency to quench combustion reactions as the temperature difference between the combustion gas and the heat pipe is reduced.

BRIEF DESCRIPTION OF THE DRAWINGS

Further objects and advantages of the invention will become apparent from the following description and claims, and from the accompanying drawings, wherein:

DETAILED DESCRIPTION OF PREFERRED EMBODIMENTS

Figure 1:
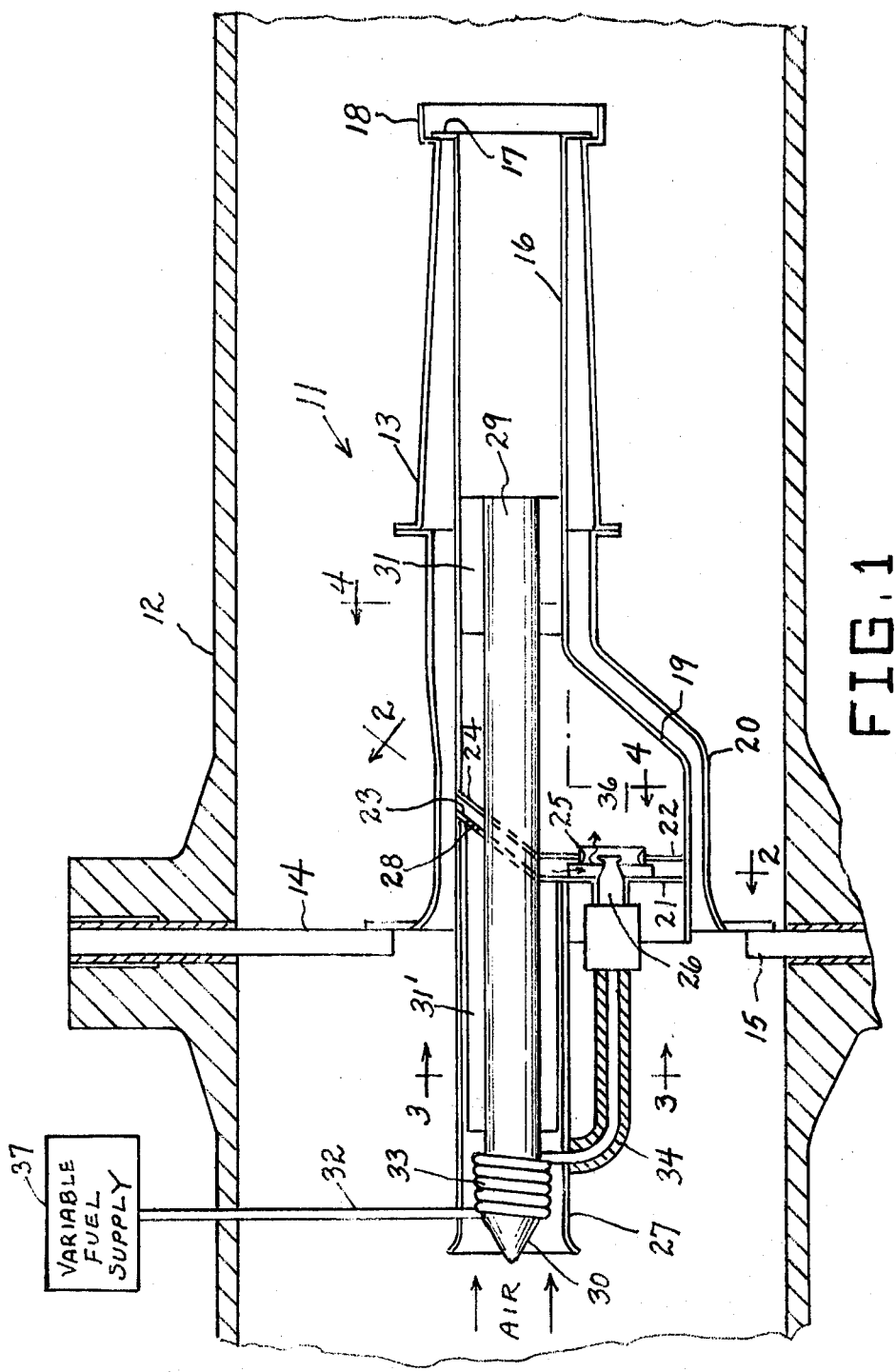
FIG. 1 is a fragmentary longitudinal vertical cross-sectional view taken through a jet engine assembly with a fuel-air preheating system and a heat pipe, constructed and arranged in accordance with the present invention.
Figure 2:
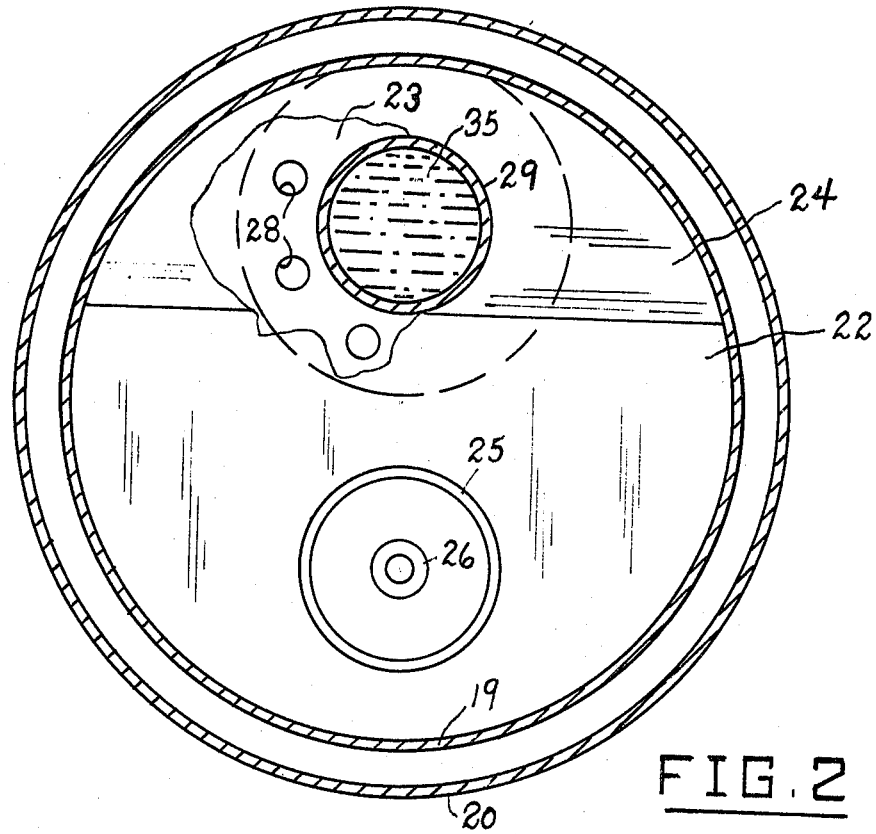
FIG. 2 is an enlarged transverse cross-sectional view taken substantially on line 2—2 of FIG. 1.
Figure 3:
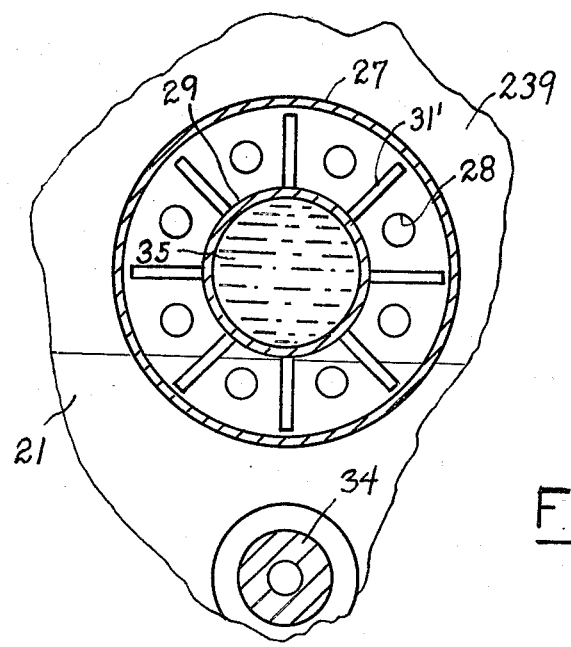
FIG. 3 is an enlarged transverse vertical cross-sectional view taken substantially on line 3—3 of FIG. 1.
Figure 4:
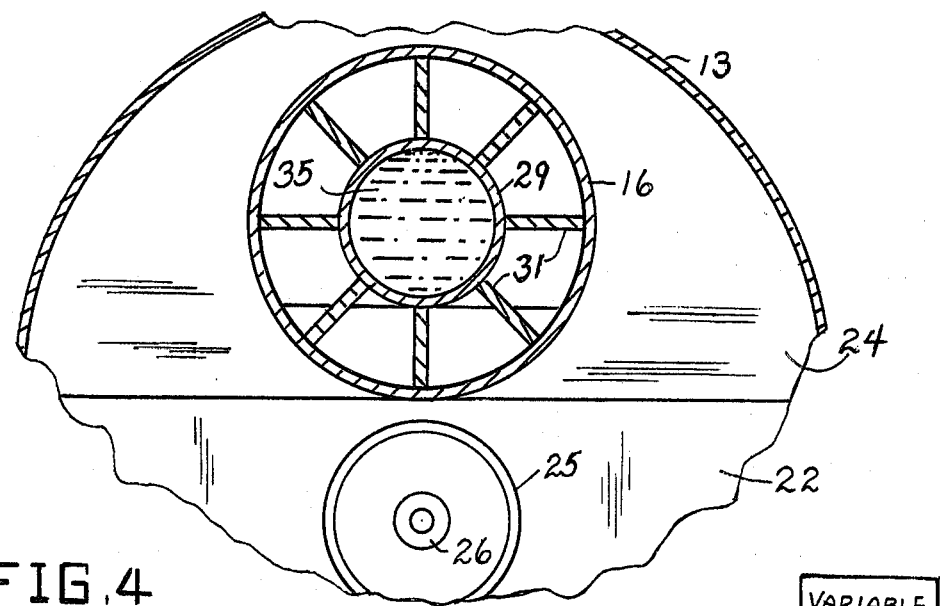
FIG. 4 is a fragmentary enlarged transverse vertical cross-sectional view taken substantially on line 4—4 of FIG. 1.

Referring to the drawings, and more particularly to FIGS. 1 to 4, 11 generally designates a single-can heat pipe combustor constructed in accordance with the present invention. The combustor 11 is rigidly mounted in a conventional manner substantially coaxially in an outer tubular housing 12 which permits air to enter at its left end, as viewed in FIG. 1, and discharge a power jet stream at its right end. The combustor 11 comprises an outer casing 13 which is rigidly secured to main housing 12 by conventional supporting brackets 14, 15. An inner casing 16 is rigidly secured via an end flange 17 to the annular exit portion 18 of outer casing 13 and is thereby supported substantially axially in the outer housing 12.

Casing 16 is integrally formed with an outwardly enlarged combustion chamber 19 which is offset from the axis of main housing 12, and the outer casing 13 has a conformably enlarged wall portion 20, spaced outwardly from and extending substantially parallel to the wall of combustion chamber 19. Rigidly secured in the combustion chamber 19 are respective spaced parallel partition wall member 21 and 22 which extend vertically in the leftward lower portion of the chamber and which have spaced parallel upwardly and rightwardly inclined top portions 23 and 24, as viewed in FIG. 1. The wall members 22, 24 define the leftward wall of the combustion chamber space 36. The leftwardly spaced wall members 21, 23 define, with wall members 22, 24, an air flow space leading to an annular air discharge conduit 25 mounted in the wall member 22. Mounted in the leftward wall elements 21 coaxially with conduit 25 is a fuel discharge nozzle 26. The wall 23 may be eliminated, if desired.

The casing 16 is provided with a tubular leftward air intake extension 27 which is axially aligned with the rightward discharge portion of casing 16 and which is rigidly secured to the upper portion of wall element 21 and its associated upper inclined wall element 23. The upper portion of wall element 21 and the associate optional inclined wall element 23 are formed with annular passages 28 (see FIGS. 2 and 3) communicatively connecting intake conduit 27 to the air passage defined between wall elements 21, 22.

Designated at 29 is a heat pipe which is axially mounted in the cylindrical leftward portion of casing 16 as shown in FIG. 1, which is sealingly rigidly connected to and extends through wall elements 23, 24, and which extends axially through the air intake conduit 27, terminating in a conical tip 30. The right end portion of heat pipe 29, as viewed in FIG. 1, is provided with a plurality of radial, evenly spaced, longitudinal heat conductive fins 31 which are rigidly secured in the cylindrical portion of casing 16. Additional radial, evenly spaced, heat conducting longitudinal fins 31' are provided on the portion of the heat pipe 29 extending leftwardly from partition wall elements 23, 21.

Liquid fuel is furnished to nozzle 26 from a suitable variable fuel supply source 37 via a conduit 32, a coiled heat exchanger portion 33, surrounding and coiled on the left end portion of heat pipe 29, and heat-insulated connecting conduit portion 34.

The heat pipe 29 comprises an elongated, generally cylindrical, closed chamber of high temperature metal, or the like, partially filled with heat conducting material 35, such as liquid sodium.

Conventional ignition means, not shown, may be provided for initially igniting the combustible mixture injected into the combustion space, shown at 36.

The fins 31 on the hot end of the heat pipe 29 aid considerably in heat absorption from the combustion gases and in heat transfer to the heat pipe 29, thus acting as a heat exchange assembly. The upstream fins 31' are preferably maximized in length to facilitate the transfer of heat from the heat pipe 29 to the air inlet entering the air intake conduit 27, and also act as a heat exchange assembly.

In operation, the heat pipe 29 removes heat from the hot combustion gases and transfers this heat to warm the inlet air and fuel. The higher-temperature inlet air and fuel burn with a higher combustion efficiency than unheated air and fuel. This more efficient combustion reduces the exhaust emissions of carbon monoxide and unburned hydrocarbons. In typical operation, the heat pipe 29 should operate at about 1200° F. at engine idle and rise to about 1400° F. at a full power condition. At idle, the inlet air temperature should rise about 150° F. and the fuel temperature about 250° F. At full power the air temperature rise should be about 20° F. and the fuel temperature rise should be about 250° F.

The offset location of the heat pipe 29, at the radial outermost region of the combustion space 36, inhibits quenching of the combustion gases in the space 36, and also prevents excessive coking of the fuel on the heat pipe 29, particularly where the local fuel pressure, fuel temperature, and flow velocity can be controlled. Also, autoignition of the fuel during preheating is prevented, since the fuel is kept separate from the air during this phase of operation. By having a separate fuel heater 33, the heat pipe 29 can be designed to operate at higher temperatures, since auto-ignition and coking are no longer a problem. The higher heat pipe temperatures significantly reduce the surface area required to heat the inlet air and fuel, while reducing any remaining tendency to quench combustion reactions as the temperature difference between the combustion gases and the heat pipe is reduced.

The above-described heat pipe application can be used in can combustors, annular combustors and double annular combustors. Significant reductions in exhaust emissions can be obtained in almost any combustor type of engine by the careful use of heat pipes in accordance with the technique employed in the present invention.

Figure 5:
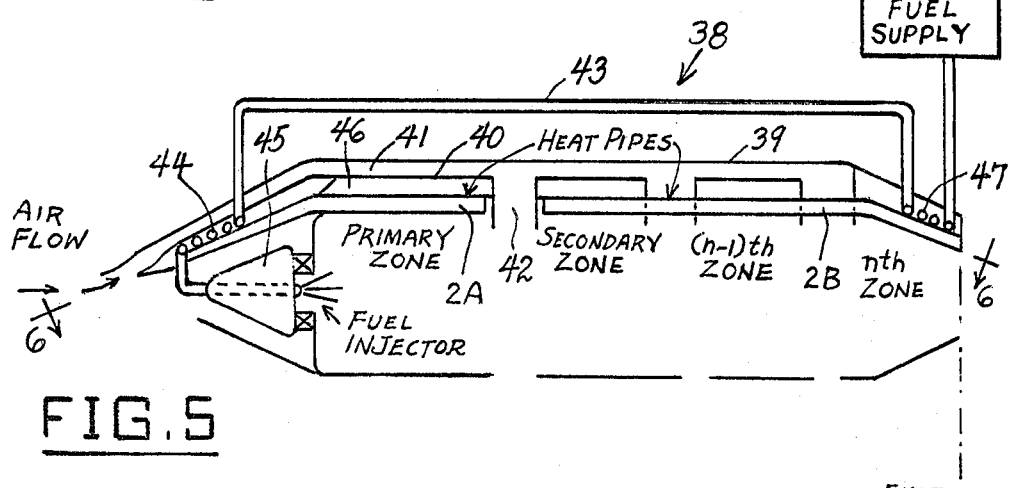
FIG. 5 is a diagrammatic longitudinal sectional view illustrating a different form of engine assembly employing multiple heat pipes arranged in accordance with the present invention.
Figure 6:
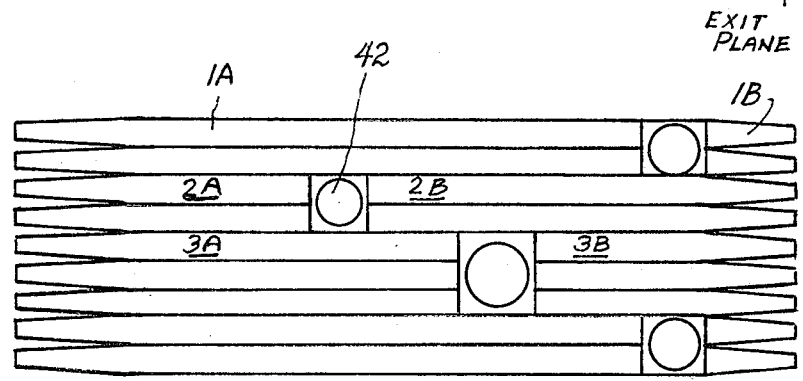
FIG. 6 is a diagrammatic view taken substantially on line 6—6 of FIG. 5, showing the heat pipes in developed form.

FIGS. 5 and 6 diagrammatically illustrate a typical extension of the above-described employment of heat pipes. In FIG. 5, the combustor, designated generally at 38, employs offset heat pipes to cool the entire combustor liner assembly, comprising an outer liner casing 39 and a pressure shell 40, spaced inwardly from outer casing 39 to define an air insulating gap or space 41. Air injection ducts 42 are provided along the combustor liner assembly, directed inwardly from the space 41, spaced longitudinally and laterally offset relative to each other. The heat pipes are mounted inwardly adjacent the pressure shell 40. Each heat pipe 1A, 2A, 3A, etc., begins at the combustor inlet and ends at a respective air injection duct 42 encountered thereby. A new heat pipe 1B, 2B, 3B, etc., begins at the downsteam end of the duct 42 and extends to the exit end of the combustor, where it transfers heat to a fuel heat exchanger 47. These latter heat pipes are designated at 1B, 2B and 3B in FIG. 6. The fuel, after cooling the downstream heat pipes 1B, 2B, 3B, etc., is then routed via conduit 43 to a fuel heat exchanger 44 employed on the upstream ends of the heat pipes 1A, 2A, 3A, etc., and then is furnished to the fuel injection nozzle assembly 45. No two air injection ducts 42 are in the same axial plane.

The inner liner assembly, not shown, is of a construction generally similar to that of the outer liner assembly.

It will be seen that the space between outer liner casing 39 and shell 40 defines an air transfer conduit, connected by heat conductive fins 46 to the heat pipes 1A, 2A, 3A, etc., corresponding to the structure associated with the air intake conduit 27 of FIG. 1.

The casing structure shown diagrammatically in FIG. 5 represents a portion of the casing of a combustor of the annular-casing type, such as that disclosed in U.S. Pat. No. 4,052,144 to Cecil J. Marek. The present invention provides two important improvements over the Marek patent. The first is the offset location of the heat pipe in relation to the primary combustion zone, rather than being submerged in the primary combustion zone. The offset location prevents the heat pipe, which is cold compared to hot combustion gases from quenching the combustion reaction especially at ground start, altitude relight, or even engine idle conditions. The second improvement is the separate fuel heater which prevents auto-ignition of air fuel mixtures by keeping the fuel and air separate, and also prevents the fuel from coking on the heat pipe as it is contained in a heat exchanger where the fuel's local pressure, temperature and velocity can be controlled to prevent coking.

While certain specific embodiments of fuel combustors employing heat pipes for improved engine efficiency have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A combustor comprising casing means having an air receiving conduit open adjacent one end portion of the casing means to receive air, said casing means having an opposite exit end portion and having an intermediate combustion space, heat pipe means mounted longitudinally in said casing means and being positioned at the radial outermost region of and extending alongside said combustion space for inhibiting quenching of combustion gases, said heat pipe means being arranged in heat-transmitting relationship with said conduit for preheating incoming air, means to guide the heated air into said combustion space, fuel discharge nozzle means radially disposed from said heat pipe and mounted in said combustion space, fuel supply means, and fuel conduit means connecting said supply means to said nozzle means and including heat transfer means in heat-transmitting relationship with the heat pipe means for preheating the fuel, said heat transfer means comprises a coiled portion of said fuel conduit means engaged on said heat pipe means whereby the fuel and air are heated separately before being mixed.

2. The combustor of claim 1, and downstream heat exchanger means on the downstream portion of said heat pipe means adjacent to the downstream end of the combustion space and arranged to transfer heat to the fuel.

3. The combustor of claim 1, and downstream heat exchanger means on the heat pipe means comprising a plurality of spaced heat-conductive fins connecting the heat pipe means to the casing means adjacent to the downstream end of the combustion engine.

4. The combustor of claim 1, and wherein said means to guide the heated air comprises a hollow partition wall adjacent to the combustion space, said wall being communicatively connected between the air-receiving conduit and the combustion space.

5. The combustor of claim 4, and wherein said nozzle means is mounted in said hollow wall and said hollow wall has a discharge conduit coaxially aligned with the nozzle means and communicatively connecting the interior of the hollow wall with the combustion space.

6. The combustor of claim 1, and wherein said heat pipe means is mounted substantially coaxially with said air-receiving conduit.

7. The combustor of claim 6, and wherein said heat pipe means is provided with a plurality of heat transfer fins on its upstream portion for facilitating intake air heating and with additional heat transfer fins on its downstream end portion for facilitating transfer of heat from the combustion space to the heat pipe means.

8. The combustor of claim 1, and wherein said means to guide the heated air comprises inwardly directed ducts communicatively connecting the air-receiving conduit to the combustion space.

9. The combustor of claim 8, and wherein said heat pipe means comprises a plurality of side-by-side heat pipes forming a cylinder around said combustion space, and wherein said ducts are spaced longitudinally from each other and are offset laterally relative to each other.

* * * * *